Dec. 1, 1959
S. C. LYONS
2,915,412
METHOD OF HANDLING AND CONDITIONING
PAPER MAKING CLAY FOR USE
Filed March 15, 1957
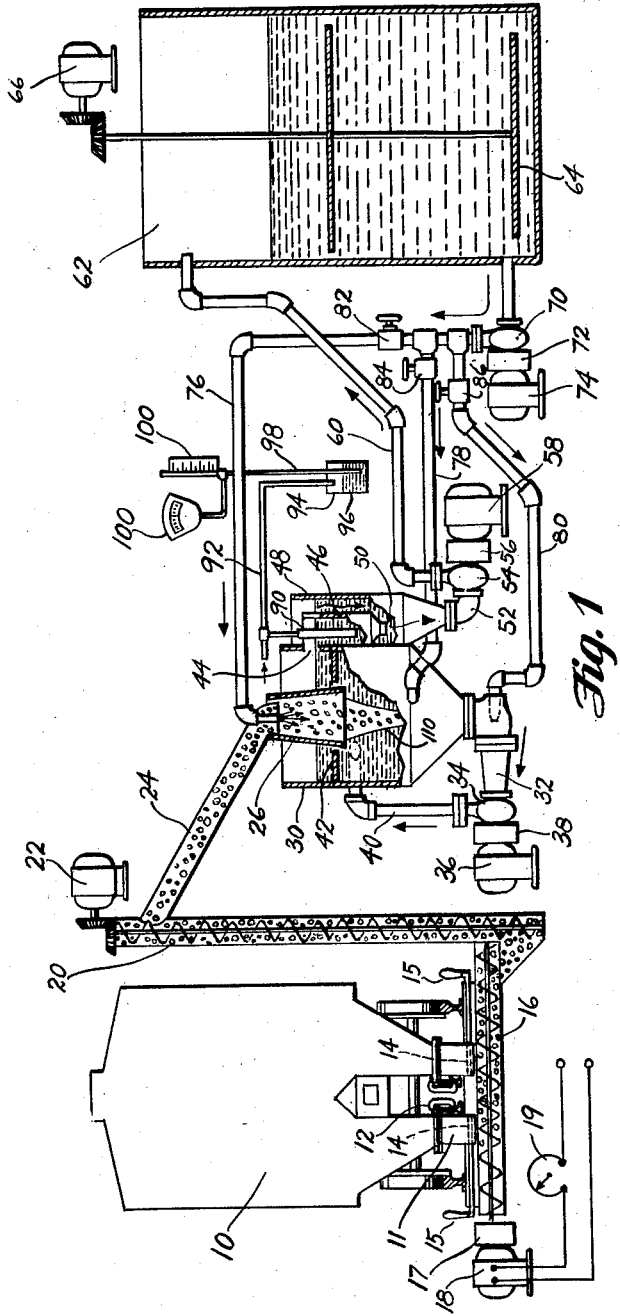
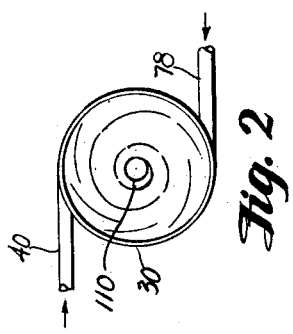
INVENTOR
Sanford C. Lyons
by Moore + Altman
ATT'YS United States Patent Office 2,915,412
Patented Dec. 1, 1959

2,915,412

METHOD OF HANDLING AND CONDITIONING PAPER MAKING CLAY FOR USE

Sanford C. Lyons, Bennington, Vt., assignor to Georgia Kaolin Company, Elizabeth, N.J., a corporation of New Jersey Application March 15, 1957, Serial No. 646,245

5 Claims. (Cl. 106—286)

This invention relates to a method of receiving dried, processed clay from the vehicle in which it is shipped and mixing it with water to produce a slurry of prescribed consistency. The process of mixing dried clay and water to form a slip or slurry is known in the industry as "makingdown" the clay.

When clay of the kaolin variety is first mined, the lumps or chunks are blunged to reduce them to a slurry which can be further treated. Blunging requires vigorous agitation, mixing, cutting, attrition, or similar disrupting mechanical treatment. This is because the clay as it comes from the ground contains from 25% to 28% moisture which thoroughly saturates it. The presence of free water around the clay has little effect thereon so that in order to reduce the lumps to a slurry the lumps must be forcibly crushed, chopped, abraded, or otherwise disintegrated. After the clay has been purified and classified in a centrifuge for particle size, it is then usually dried for shipment to paper mills or other users of the clay. The clay is almost always shipped in dry form and must be reduced to a slip or slurry by the consumer. This differs considerably from the blunging process inasmuch as dry clay, that is, clay containing only in the neighborhood of 3% to 5% moisture, contains countless interstitial voids filled with air. When water is applied to clay in this condition it is sucked in by capillarity and the internal pressure built up in a lump of clay by the incoming water apparently helps to disintegrate the lump rapidly. Hence the operation of makingdown dry clay into a slurry requires far less mechanical agitation than does the process of blunging.

Paper makers require different concentrations of clay slurries for different uses in paper making. For example, if the clay is to be fed into a paper making beater as a filler, the slurry need not be more concentrated than about 50% solids. For a paper coating operation however it is usually necessary that the slurry be developed to a very high solids concentration, e.g., 70% or so. In producing a slurry of such high solids concentration, it is necessary that the fluid system be maintained in a state of efficient deflocculation which is usually attained by the judicious introduction of certain chemical dispersing agents such as various alkali metal polymerized metaphosphates. An example of these reagents is sodium hexametaphosphate which is sold under the trade name of "Calgon."

The method now employed by consumers generally for the production of a clay slurry from dried clay consists in putting together a batch of dried clay and a measured quantity of water and mixing the two by means of a sigma-blade mixer or other apparatus capable of forcibly operating on heavy mixtures of clay and water. Considerable power is required in this process and also massive apparatus. According to the present invention a measured amount of water (and dispersing reagent) for a batch of clay is put into a makedown tank and is circulated by a suitable pump through a vortex mixer into which clay is introduced in a steady stream. The clay is fed into a vortex or whirling pool of water or slurry in the mixer wherein the water constituent is in excess until the final stages of the makedown operation. A stream of this clay mixture is withdrawn from the bottom of the mixer and recirculated into the vortex tangentially to maintain the whirling movement thereof. As the clay is fed into the pool, the slurry becomes progressively thicker until finally the last of the clay has been introduced into the mixer. Even if the ultimate consistency is one of high solids concentration, the mixing of up to 80% of the clay is done under favorable circumstances of low concentration of solids. The final stages of makingdown clay to a slurry of high solids consistency must be carried out with care, the rate of feeding of the dry clay into the slurry being progressively slowed down.

In customary practice the apparatus needed for makingdown clay into slurry is so bulky and clumsy that it must be located near the supply of dry clay, for example, near the warehouse in which the dry clay may be stored by the consumer. According to the present invention the vortex unit can be located near the point of receipt of the dried clay but the makedown tank and any additional storage tanks which may be desired or employed can be located conveniently at or near the point of use. This is because it is easy to run pipes for any reasonable distance through which the slurry can easily be pumped from the vortex unit to the makedown tank and the storage tanks. This results in a great saving in the initial cost of the necessary apparatus and in the cost of handling and transporting the makedown slurry.

For a more complete understanding of the invention, reference may be had to the following description thereof, and to the drawing, of which—

Figure 1 is a schematic illustration of apparatus embodying the invention, and

Figure 2 is a plan view of the vortex unit shown in Figure 1 with a whirling pool of slurry therein.

Dried clay is received from a vehicle 10 such as a box car or covered hopper car through short chutes 11 which are attached temporarily to the car by clamps 12 and are provided with slide valves 14 operable by handles 15 to control the rate of discharge of clay from the vehicle. The clay falls into a horizontal conveyor 16 which is driven through suitable reduction gearing 17 by a motor 18 the speed of which can be controlled by a rheostat 19. The rate of feed of clay to the apparatus can thus be controlled at the source by adjustment of the slide valves 14 or by adjusting the rheostat 19 to change the speed of the motor 18 which drives the conveyor 16.

On the drawing speed-reduction gear units have been shown connecting the various motors with the mechanism driven thereby. It is to be understood that such units are optional and that the drive in any case can be direct, through V-belt connections, or otherwise.

The clay delivered by the conveyor 16 is elevated by a vertical conveyor or hoist 20, driven by a motor 22, and discharged into a sloping chute 24 which opens into a spout 26 which preferably flares downward and is made of soft rubber suitably stiffened with patches of fabric or other reinforcing material (not shown).

Below the spout 26 and coaxially aligned therewith is a vortex unit 30 which may be cylindrical except for a tapered lower portion which opens into a recirculation pipe 32. This pipe leads to a pump 34 driven by a motor 36 or other power means through reduction gearing 38 if desired. The pump discharges the stream through a pipe 40 into the vortex unit 30. The pipe 40 opens into the unit tangentially so that the stream therefrom maintains a whirling movement in the pool of water or slurry within the unit. Fixed within the unit 30 is an annular baffle 42 which is at a level higher than the orifice of the pipe 40. The spout 26 extends down a short distance below the baffle 42 and is spaced from the inner edge of the baffle so that the slurry can flow upward past that edge and escape through a lateral opening 44 in the wall of the unit 30 at a level higher than the baffle. The slurry flowing out through the opening 44 enters a vertical receptacle 46 which is within a larger vertical receptacle 48. Most of the slurry which enters the inner receptacle 46 spills over its top or through a notch therein into the outer receptacle 48, but a sufficient stream flows down through an opening in the bottom of the inner receptacle 46 to make the receptacle self-purging by preventing the settling out of clay particles therein. The purpose of the receptacle 46 is to cooperate with means hereinafter described for keeping a continuous indication of the consistency of the slurry which is being discharged from the unit 30. The receptacle 48 discharges at its bottom into the suction pipe 52 of a centrifugal pump 54 which is driven through a reduction gear train 56 by an electric motor 58. The pump 54 sends the slurry from the receptacle 48 through a pipe 60 into a storage tank 62 which is preferably provided with a slow motion stirring device 64 driven by a motor 66 to prevent settling. Slurry from the lower portion of the tank 62 is recirculated to the vortex unit 30 by a centrifugal pump 70 which is operated through a gear reduction box 72 by a motor 74. The pump 70 discharges into three pipes 76, 78 and 80, the flow in which is controlled by valves 82, 84 and 86, respectively. The pipe 76 enters the chute 24 near its discharge end and is arranged to send a stream of slurry down through the spout 26. This jet is particularly useful when the dry clay is supplied in powdery form. The pipe 78 enters the vortex unit 30 tangentially and assists in maintaining a strong whirling movement of the pool therein. The pipe 80 enters the discharge pipe 32 and dilutes the slurry which flows down from the vortex unit for recirculation. This is important when the slurry in the vortex unit reaches a consistency of 60% or so of solids as it tends to prevent the pump 34 from being clogged by a slurry that is too stiff.

In order to keep constant track of the consistency of the slurry which is being discharged from the unit 30, a pressure bell 90 extends down from a pipe 92 into the pool of slurry in the inner container 46. The pipe 92 also extends into a closed container 94 which is partially filled with a suitable liquid 96. Air under pressure is supplied to the pipe 92 from any suitable source. A tube 98 has its open lower end within the pool of liquid 96 so that air pressure from the tube 92 acting on the surface of the pool 96 forces some of the liquid in the pool to rise in the tube 98. The upper end of the column indicates by means of a scale 100 the density of the slurry in the inner container 46. A dial gauge 102 may also be employed for the same purpose. The pressure bell 90 is in the form of a tube having an open lower end submerged in the pool of slurry within the container 46. The air supplied to the tube 92 bubbles out through this open end so that the pressure at this point is a measure of the density of the slurry in the receptacle 46. As the consistency of the slurry increases with the addition of clay fed through the spout 26 into the vortex unit 30, the pressure at the bottom of the pressure bell 90 increases accordingly and is reflected in an increase of height of the liquid column in the tube 98, the pressure also being indicated on the scale of the dial indicator 102.

The makedown tank 62 is shown for convenience as being near the vortex unit 30 but since it is easy to run pipes for reasonable distances, this tank and any additional storage tanks, not shown, can be easily located where desired.

The consistency of the slurry in the vortex unit 30 increases steadily with the constant addition of dry clay to the mixture. Since in the early stages of operation there is a large excess of water the makingdown of the clay can proceed at a rapid rate until the consistency reaches a point above 50% solids. Thereafter the rate of feed of dry clay into the system should be slowed down by adjustment of the slide valves 14 or the rheostat 19. This reduction of rate of feed of dry clay is to prevent localized and transitory solidification of the slurry which might block the flow at various points in the apparatus.

The operation of the apparatus is as follows. Dry clay in any of the forms in which it is customarily shipped to consumers is fed by gravity from the car or truck into the conveyor 16 which delivers it to the hoist 20. The clay then slides down the chute 24 and through the spout 26 into the pool of slurry whirling in the vortex unit 30. The spout 26 is preferably made of molded rubber so as to be flexible. The lower end of the spout is in contact with the whirling pool and is agitated thereby so that drops or gobs of slurry which are splashed against the inner surface of the spout are shaken loose before they can build up an increasing layer of drying clay which might eventually clog the spout. With the incoming stream of dry clay is mixed a stream of slurry from the recirculation pipe 76. This is especially desirable when the clay is supplied in powdery form.

The whirling movement of the vortex maintains a cavity 110 in the center which tapers downward to a point at or near the bottom outlet of the unit 30. If the dry clay is supplied in lumps, these fall into the cavity 110 and are caught by the rapidly moving liquid surface. The dry clay is absorbent so that the water absorbed from the pool and the rending action resulting from the falling lumps impinging on a rapidly moving surface tend to disintegrate the lumps. If the slurry in the pool is below 40% solids, the disintegration of the clay lumps is practically spontaneous. When the percentage of solids in the slurry exceeds 40%, the dry clay takes water from the slurry with increasing difficulty so that mechanical attrition must be increasingly employed. This is provided by the slurry itself as it is pumped through the recirculation pump 34. Any lumps of clay which have not completely disintegrated in the vortex work their way centrifugally to the wall of the unit 30 and downward by gravity to the discharge pipe. They then pass through the pump 34 with the slurry stream and are subjected to the hydraulic shearing action of the slurry which increases as the percentage of solids in the slurry increases. If any lumps return to the unit 30, they recirculate by the same path until disintegration is complete. Meanwhile the lump-free surface layer of the pool flows upward past the inner edge of the baffle 42 and out through the opening 44 to be pumped to the makedown tank 62.

The dried clay may be fed into the vortex until the desired consistency is indicated by the gauge 102. Preferably, before operations are started, a measured quantity of water calculated to be nearly sufficient to makedown the known quantity of clay in the vehicle to a slurry of the desired consistency is introduced into the makedown tank 62 and is being circulated through the vortex unit 30 when the clay starts coming in. The slight calculated deficiency in the quantity of water supplied is to take care of a possible unknown excess of moisture in the clay as supplied. When all of the clay has been madedown, additional water can easily be introduced if the slurry is found to be too thick.

The clay supplied to be madedown may or may not have therewith a sufficient amount of a deflocculating reagent to ensure maximum fluidity of the slurry when it has high percentages of solids content. If the addition of a deflocculating reagent is necessary, the exact amount required for a given batch of clay can be readily calculated and that amount can be added to the initial volume of water. Thus, as an added benefit, the made-down clay will have exact predetermined percentages of solids and reagents at the expense of relatively little effort.

During the early stages of an operation on a batch of clay, the clay may be fed rapidly into the vortex. When, however, the gauge shows a consistency in excess of 40% solids, the rate of feeding of clay should be progressively reduced in accordance with the decreasing ability of the vortex to receive clay without causing the recirculation pump to clog. Especially watchful care must be exercised when the solids in the slurry exceed 60%.

The apparatus hereinbefore described is versatile in that it will handle all of the recognized types of paper making clay, such as pulverized, drum-dried, extruded lump, spray dried, and granulated, with almost equal facility.

The apparatus may also be provided with safety devices (not shown) for stopping the operation of the motor 18, which initiates the feed of dry clay into the vortex unit, if anything goes wrong with any of the other motors which circulate the slurry.

Various modifications and changes in the particular construction of the several portions of the apparatus hereinbefore described may be made without departing from the scope of the invention as defined in the appended claims.

I claim:

1. The method of reducing a known quantity of dry clay to a slurry of desired consistency, which comprises forming a pool of water nearly sufficient to reduce the clay to a slurry of the desired consistency, forming a portion of said water into a vortex, feeding dry clay into said vortex to form a slurry, recirculating lump-free slurry from the top of said vortex to said pool and back to said vortex, and recirculating slurry from the bottom of said vortex through a pump to subject undisintegrated clay therein to hydraulic shearing and introducing it into the vortex tangentially.

2. The method of reducing a known quantity of dry clay to a slurry of desired consistency, which comprises forming a separate pool of water nearly sufficient to reduce the clay to a slurry of desired consistency, dissolving in said pool measured amounts of chemical dispersing agents just sufficient for desired treatment of said quantity of clay, forming a portion of the solution into a vortex by introducing the same tangentially into a container, feeding dry clay into said vortex to form a slurry, recirculating slurry from the bottom of the vortex through a pump to subject undisintegrated clay therein to hydraulic shearing and introducing it tangentially into the side of the vortex to maintain the vertical movement, constantly withdrawing lump-free slurry from the top of the vortex and delivering same to said pool, and transferring from said pool to said vortex sufficient slurry to maintain the volume of the vortex substantially constant.

3. A method as described in claim 2, some of the slurry transferred from said pool to said vortex being introduced tangentially into the side of the vortex.

4. A method as described in claim 2, some of the slurry transferred from said pool to said vortex being introduced into the stream of slurry recirculating from the bottom of the vortex to the side thereof.

5. A method as described in claim 2, some of the slurry transferred from said pool to said vortex being introduced into the dry clay entering the vortex.

References Cited in the file of this patent

UNITED STATES PATENTS

| | | |
|---|---|---|
| 1,318,282 | Johnson | Oct. 7, 1919 |
| 1,646,540 | Johnson | Oct. 25, 1927 |
| 2,158,987 | Maloney | May 16, 1939 |
| 2,653,801 | Fontein et al. | Sept. 29, 1953 |
| 2,664,277 | Davies | Dec. 29, 1953 |